United States Patent [19]

Katayama et al.

[11] 4,201,069

[45] May 6, 1980

[54] KNOB FOR A DOOR LOCK

[76] Inventors: Akira Katayama, 195-2 Kubo Tamaki-cho; Osamu Shimoi, 2-202 Koyosokushinjyutaku 541-4 Akeno Obato-cho, both of, Watarai-gun, Mie-pref., Japan

[21] Appl. No.: 964,060

[22] Filed: Nov. 27, 1978

[30] Foreign Application Priority Data

| | | | |
|---|---|---|---|
| Nov. 29, 1977 | [JP] | Japan | 52-159170[U] |
| Dec. 10, 1977 | [JP] | Japan | 52-165846[U] |
| Dec. 28, 1977 | [JP] | Japan | 52-179530[U] |

[51] Int. Cl.$^2$ ........................ B60R 25/02; E05B 63/00

[52] U.S. Cl. ........................................ 70/422; 70/224; 70/416

[58] Field of Search .................. 70/422, 1.5, 107, 1.7, 70/416, 417, 224

[56] References Cited

U.S. PATENT DOCUMENTS

| | | | |
|---|---|---|---|
| 812,905 | 2/1906 | Voight | 70/422 |
| 2,138,856 | 12/1938 | Harp | 70/422 |
| 3,621,685 | 11/1971 | Sargent | 70/107 |

*Primary Examiner*—Robert L. Wolfe

*Attorney, Agent, or Firm*—David L. Garrison

[57] ABSTRACT

The present invention relates, in a door lock in which a door knob is locked when the door is locked, to a knob for a door lock which is not disengaged from a lock device and secure even if the knob is intended to be twisted or pulled out resulting from the outside attack.

8 Claims, 6 Drawing Figures

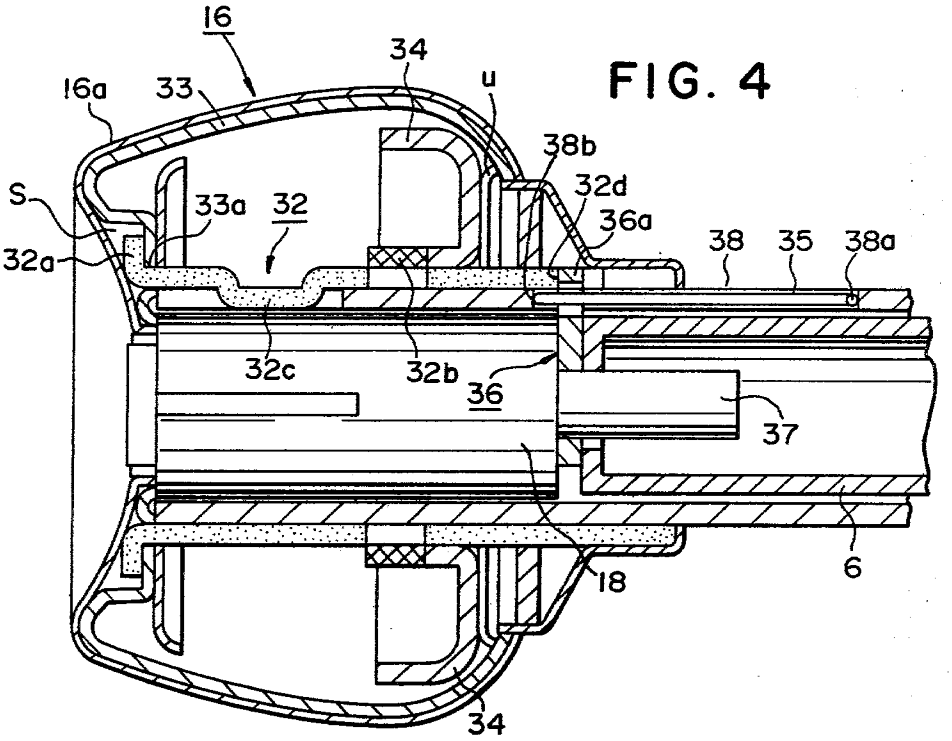
FIG. 4
FIG. 5
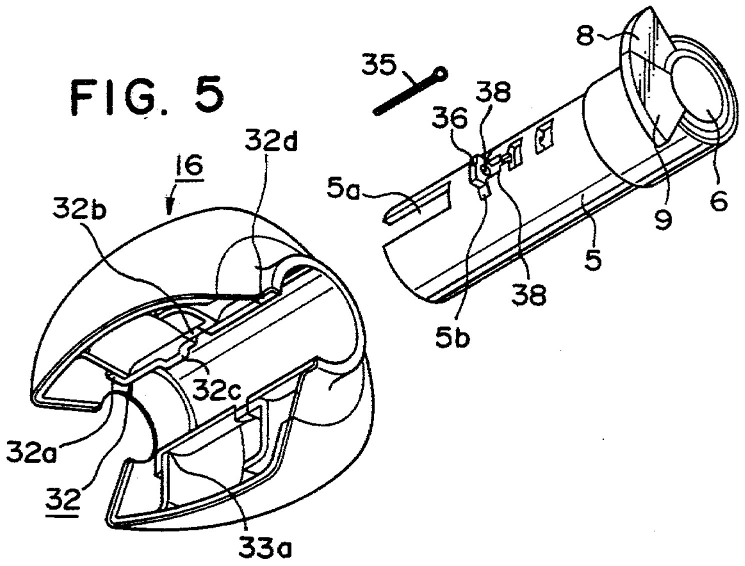

KNOB FOR A DOOR LOCK

BACKGROUND OF THE INVENTION

In a prior art knob for a door lock, the knob and a spindle are integrally connected so that when the knob is forcibly twisted off, the spindle is also twisted off at the same time, resulting in possible improper unlocking. In the past, there is proposed an auxiliary lock for the exclusive use of prevention of crimes disposed independently of the knob lock in order to prevent the destruction of the aforesaid auxiliary lock from the outside. However, since the usability of the knob is pursued in terms of its primary object, it has never been proposed to provide an arrangement in which a knob itself is provided with a destruction preventive mechanism. This is because of the fact that the provision of the destruction preventive mechanism on the knob itself results in a lowering of the usability thereof.

The present invention is to prevent the destruction of the knob from the outside without lowering the usability of the knob.

The present invention provides a door lock in which locking is made possible from the indoor side by depressing a push button on the indoor side whereas unlocking is made possible from the outdoor side upon insertion of a key into a cylinder encased in the knob on the outdoor side, the door lock being constructed such that a few protrusions are provided on a foremost end of a knob shaft adapted to transmit rotation of the knob for the door lock to a spindle, said protrusions being fixed to a knob back plate superposed integral with the knob, whereby when an excessive twisting load is applied to the knob, the protrusions are twisted off to provide a disengagement between the knob and the knob shaft so that the knob runs idle. Accordingly, the present invention possesses an advantage that the spindle cannot be twisted off from the outside.

Further, another object of the present invention resides in the following. That is, in the event that the protrusions at the foremost end of the knob shaft are intended to be twisted off to pull out the knob, the knob shaft is locked to the outside spindle preencased in the knob. Accordingly, in the event the aforementioned protrusions on the knob shaft are twisted off, the knob becomes slidable along the knob shaft since the knob shaft is locked to the spindle.

In accordance with the present invention, a knob bottom plate is arranged within a knob hollow portion so as to be loosely slipped on the knob shaft so that when the knob is intended to be pulled out, the knob bottom plate impinges upon the rear wall surface of the knob hollow portion to prevent disengagement of the knob. As such, the present invention has the advantage such that even if an attempt is made to twist the knob or pull out thereof, the knob cannot positively disengaged from the lock mechanism.

BRIEF SUMMARY OF INVENTION

The present invention provides a door lock in which a knob to be locked when being locked is forcibly disengaged to prevent the release of locking and relates to a knob for a door lock for use with such a door lock characterized in that a few protrusions are provided on the foremost end of a knob shaft adapted to transmit rotation of the knob to an outside spindle, said protrusions being fixed to a knob back plate superposed integral with a knob face plate at the foremost end of the knob, and a knob bottom plate is loosely slipped on the knob shaft adjacent the rear end of a knob hollow portion, said knob bottom plate being brought into resiliently locking relation with a locking projection formed on the knob shaft.

With this arrangement, the present invention is to provide a lock mechanism which is so secure that the knob is not disengaged even if the knob is intended to be twisted or pulled out when attacked.

BRIEF DESCRIPTION OF THE SEVERAL VIEWS OF THE DRAWINGS

The present invention will be made more clear by reference to the accompanying drawings in which:

FIG. 4 is a front view in the section of the knob in accordance with the present invention;

FIG. 5 is an exploded perspective view of the knob in accordance with the present invention.

DETAILED DESCRIPTION

First, one example of a door lock of the type which uses a knob in accordance with the present invention shown in FIGS. 1 through 3 will be described.

Figure 3:
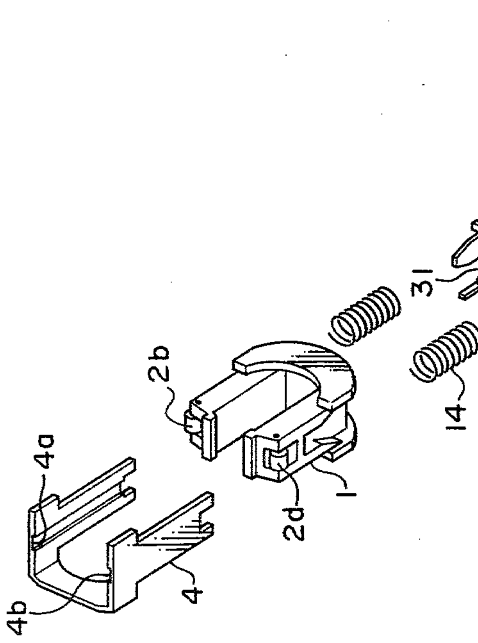
FIG. 3 is an exploded perspective view of parts of the door lock.
Figure 3:
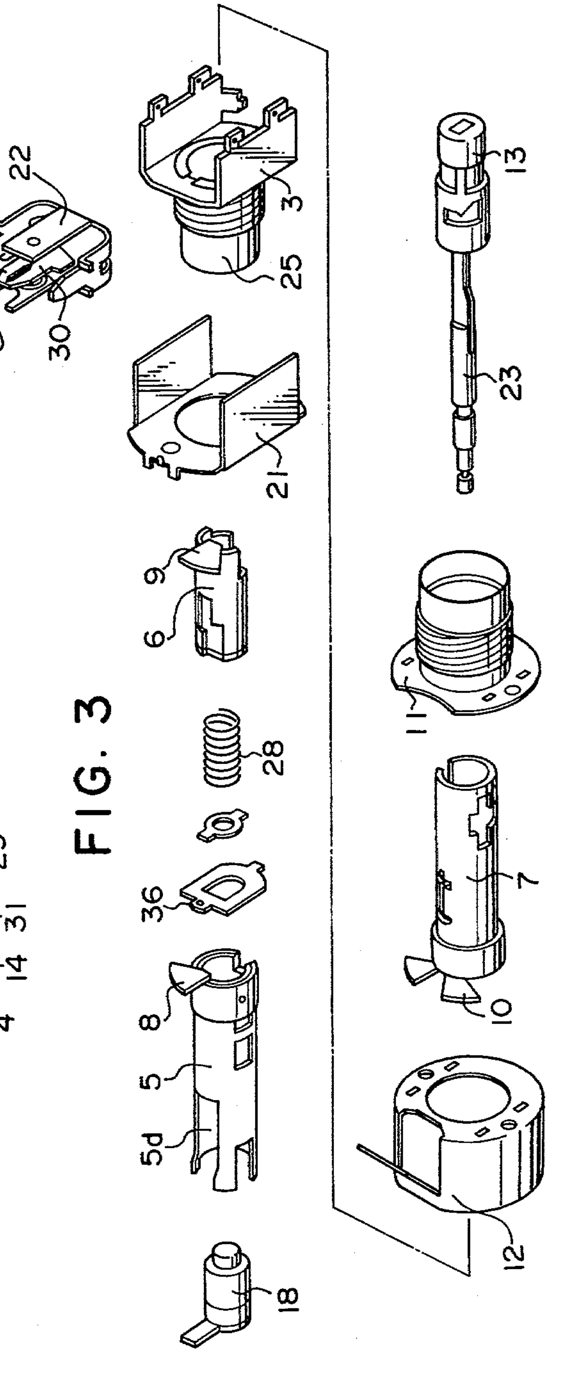

As shown in FIG. 3, a retractor 1 comprises rollers 2*a* and 2*b*, the retractor 1 being accommodated within a retractor case 3.

Rotation of retractor operating lugs 8, 9 and 10 for outside spindle 5, key spindle 6 and inside spindle 7, respectively, causes the retractor 1 to be moved within the retractor case 3.

The numeral 4 designates a roller guide, which is formed with concave-shaped grooves 4*a* and 4*b* adapted to fit to the width of the rollers 2*a* and 2*b* and in the operating direction of the retractor 1. After the retractor 1 has been accommodated into the retractor case 3, the roller guide 4 may be inserted into the retractor case 3. After the roller guide 4 has been inserted into the retractor case 3, the retractor case 3 is covered with a plate 21 of letter ⊐ and a cover 12.

Next, a locking and unlocking mechanism of the door lock used in the device of the present invention will be described.

In the drawings, the numeral 11 designates a bearing; 12, a cover; 21, a cover of letter ⊐; 13, a locking push button; 16 and 17, indoor and outdoor nobs, respectively; 18, a cylinder to be locked and unlocked by a key; and 19 and 20, indoor and outdoor seats, respectively, mounted on the door. A locking bar 23 formed with a small diameter portion 23*a* is secured to the foremost end of the locking push button 13.

Figure 1:
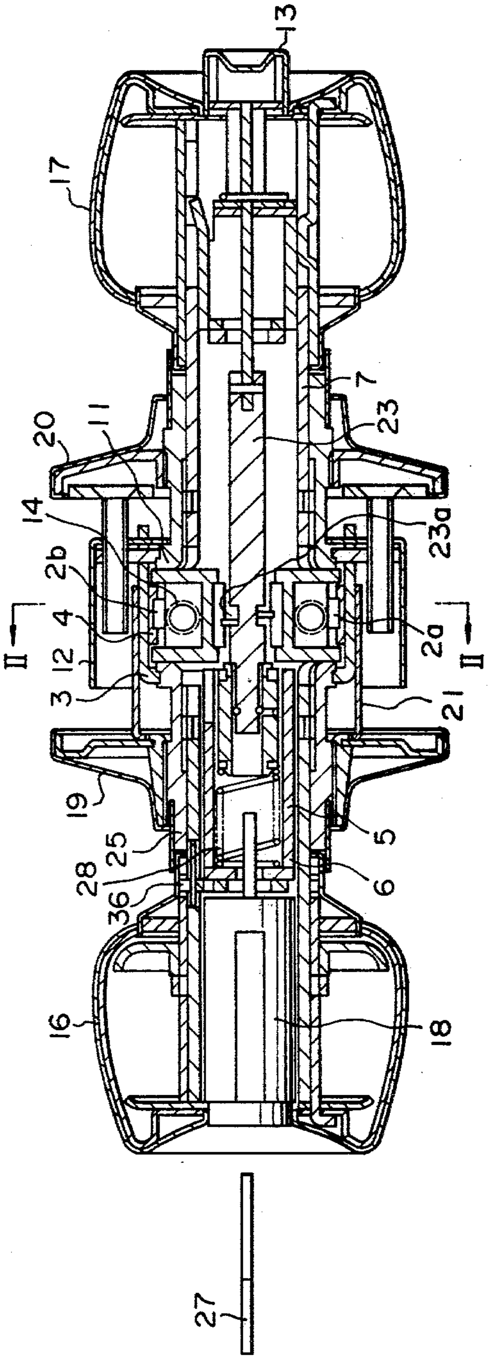
FIG. 1 is a front view in section of one example of a door lock using a knob in accordance with the present invention.
Figure 2:
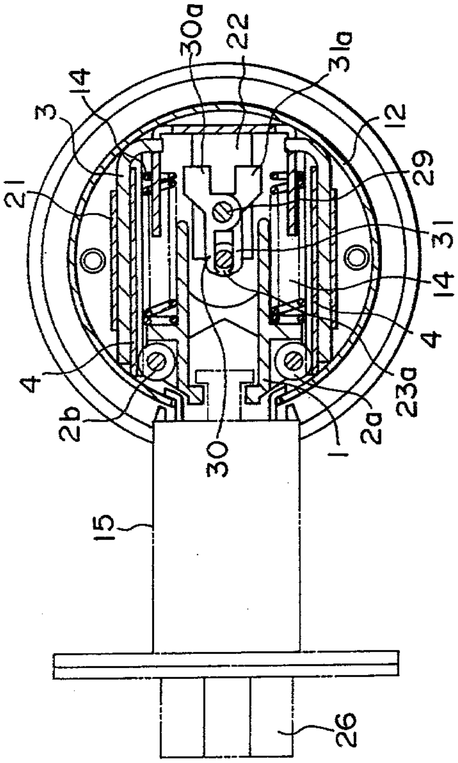
FIG. 2 is a sectional view taken on line II—II of FIG. 1.

Locking from the indoor in an unlocked state may be accomplished in a manner that when the push button 13 is depressed against the force of a spring 28, the foremost end of the locking bar 23 slidably moves leftward as viewed in FIG. 1 within a notch 5*a* in the outside spindle 5. The retractor 3 is integrally provided with a bearing 25 so as to cover the outside spindle 5 and has a notch, which will be described hereinafter.

It is designed so that the notch 5a of the outside spindle 5 and the aforesaid notch of the bearing 25 may come into engagement or disengagement due to appearance and disappearance of a cam (not shown). Thus, when the locking bar 23 is pushed by the push button 13 into sliding movement within the notch 5a of the outside spindle 5 as described above, the cam (not shown) is caused to be operated to extend into the aforesaid notch of the bearing 25 so that the bearing 25 and the outside spindle 5 come into engagement, whereby rotation of the outside spindle 5 may be checked by the fixed bearing 25.

On the other hand, at the same time when the rotation of the outside spindle 5 is checked as described above, resiliently urged clamps 30 and 31 supported at 29 on a clamp holder 22 (see FIGS. 2 and 3) engage the small diameter portion 23a of the locking bar 23 so that the clamps 30 and 31 resiliently lock the locking bar 23.

Thus, depression of the push button 13 completes locking from the indoor.

Next, unlocking from the indoor in a locked state may be accomplished in a manner that when the indoor knob 17 is turned to rotate the inside spindle 7, the operating lug 10 causes the retractor 1 to move back against the spring 14, as a consequence of which the latch 26 is moved back.

At this time, the retractor 1 urges clamp projections 30a and 31a to spread the clamps 30 and 31. At the same time, the locking bar 23 urging the cam (not shown) is biased by the spring 28 as described above and returns to a locking position along with the push button 13.

Unlocking from the outdoor in a locked state may be accomplished in a manner that when a key 27 is inserted into the cylinder 18 to rotate the key spindle 6, the operating lug 9 causes the retractor 1 to urge thereby moving back the latch 26. At this time, the retractor 1 urges the clamp projections 30a and 31a to release the locking bar 23 in a manner as previously described.

In the following, an example in which a knob of the present invention is applied to the door lock illustrated in FIGS. 1 to 3 will be described with reference to FIGS. 4 to 6. It will be noted however that the knob of the present invention is not used only for the door lock shown in FIGS. 1 to 3. The numeral 32 designates a knob shaft, and 33 is is a knob back plate. The knob shaft 32 receives therein the outside spindle 5. A knob face plate 16a of the outdoor knob 16 is integrally superposed on the knob back plate 33.

The knob shaft 32 is provided at the foremost end thereof with a plurality of projections 32a which are inserted into holes 33a in the knob back plate 33 and bended so that the knob shaft 32 may be fixed to the knob back plate 33 of the knob 16.

Since the thus bended projections 32a are housed in a gap S formed between the knob back plate 33 and the knob face plate 16a, the projections 32a are not exposed outside to provide a better appearance.

A knob bottom plate 34 is loosely slipped on the knob shaft 32 at a position in the vicinity of the rear end of the knob 16 and is resiliently locked at a locking projection 32b of the knob shaft 32 by means of a spring u.

The knob shaft 32 is formed with a hole 32d bored in a stepped portion 32c, the stepped portion 32c being inserted into a notch 5a in the outside spindle 5 to transmit rotation of the knob 16 to the outside spindle 5.

A check plate 36 is secured to the outside spindle 5 to lock the knob shaft 32 in a manner that a foremost end 36a thereof is extended externally of the outside spindle 5 by means of a spring 35.

The knob shaft 32 may be mounted and secured to the spindle 5 in the following procedure.

The foremost end 36a of the check plate 36 is forced into a hole 5b bored in an outer peripheral surface of the outside spindle 5, the cylinder 18 is rotated by the key, and the outside spindle 5 is inserted into the knob shaft 32 with a tail piece 37, which is integrally mounted on the rear end of the cylinder 18, placed in a tilted state. (FIG. 6 (a))

A spring 35 is inserted into a hole h at the foremost end 36a of the check plate 36, and hence, when the outside spindle 5 is inserted into the knob shaft 32, the foremost end 36a tends to move out of the outside spindle 5. To avoid this, the check plate 36 may be pressed by placing a finger or the like on the lower portion thereof as viewed in FIG. 6 so as to confine it within the outside spindle 5. (FIG. 6 (a)) The spring 35 has one end secured to a rear end 38a of a groove 38 in the outside spindle 5, whereas a front end 38b thereof being free and a free end being urged upwardly in FIG. 1. When the outside spindle 5 is inserted into the knob shaft 32 and the check plate 36 reaches a position of a hole 32d bored in the knob shaft 32, the foremost end 36a of the check plate 36 is received into the hole 32d by the upward biasing of the spring 35, whereby the knob shaft 32 and the outside spindle 5 may be connected into one body by means of the check plate 36 as shown in FIG. 6 (b).

Figure 6:
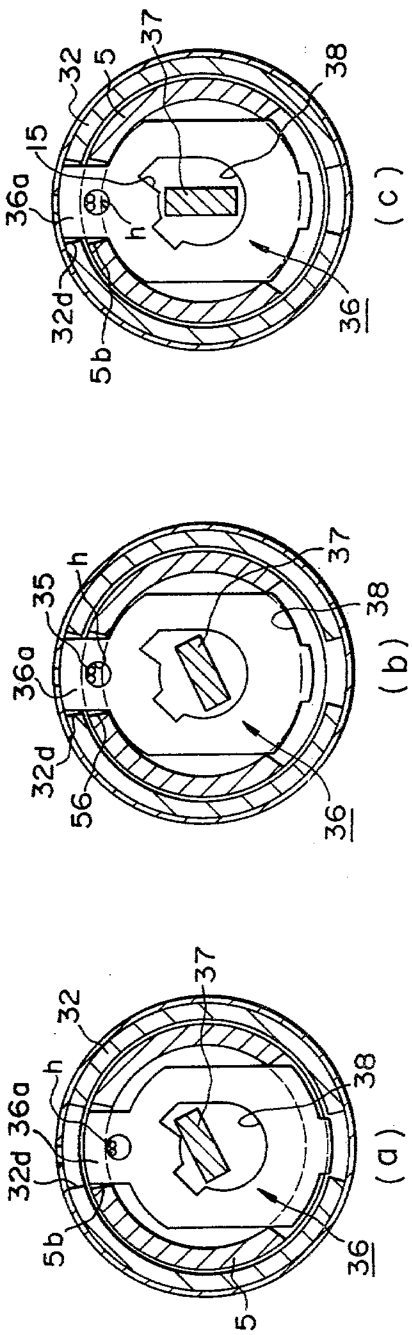
FIGS. 6 (*a*), (*b*) and (*c*) are respectively views explaining the operation of a check plate used in the knob in accordance with the present invention.

Next, when the cylinder 18 is returned to its original position, the tail piece 37 integral with the cylinder 18 also assumes a vertical state as shown in FIG. 6 (c) from the state shown in FIG. 6 (b) so that the former may be locked at the vertical wall of the locking hole 38 in the check plate 36. As a result, the check plate 36 is locked between the knob shaft 32 and the spindle 5 and will not be moved. Thus, the check plate 36 locked between the knob shaft 32 and the spindle 5 cannot be released from its locking condition unless the key 27 is used.

In the following, the operation of the device in the case the knob of the present invention is attacked from the outside will be discussed.

In the event that in a locked state, an excessive twisting load is intentionally applied to the knob 16 resulting from the external attack, the projection 32a of the knob shaft 32 inserted into the hole 33a in the knob back plate 33 is broken, and as a result, rotation of the knob 16 is not transmitted to the knob shaft 32 and of course not transmitted to the outside spindle 5, thus permitting the knob 16 to run idle on the knob shaft 32. Thus, in this case, the locking mechanism itself is not destructed and remains secure.

It should be noted of couse that shearing stress of the projection 32a of the knob shaft 32 is set smaller than the resistance of the foremost end 36a of the check plate 36 with respect to the force by which the knob shaft 32 is twisted. By setting the stress as just mentioned, only the projection 32a may be cut in a state where the knob shaft 32 and the check plate 32 are locked.

Incidentally, in this case, since the foremost end of the check plate 36 is received to be locked within the hole 32d of the knob shaft 32, the knob shaft 32 is secured to the outside spindle 5. Thus, after the knob 16 has been twisted to break the projection 32a of the knob shaft 32, the knob shaft 32 is secured to the outside spindle 5 by means of the check plate 36, and hence, the knob 16 becomes slidable on the knob shaft 32. In this state, when an attempt is made to pull out the knob 16, the rear wall in the hollow portion of the knob 16 impinges upon the knob bottom plate 34 loosely received in the knob shaft 32 and retained at the projection 32*b* of the knob shaft 32 to prevent the knob 16 from being pulled out of the knob shaft 32.

As described above, the knob of the present invention is extremely secure because the knob 16 cannot be disengaged from the knob shaft 32 and the outside spindle 5 even when attacked from the outside.

While the description has been given of the case where the knob on the door lock is attacked from the outside in the above-mentioned embodiments, it should be understood that the invention is not necessarily limited to such a case subjected to attack from the outside and that the knob of the present invention may be applied to any type of door lock as long as the knob is made impossible to rotate when locked.

What is claimed is:

1. An improved knob for use with a door lock which door knob is prevented from being forcibly twisted and disconnected from the door lock to prevent releasing of the door lock, the door lock having a spindle, the improvement of which comprises:

- a knob shaft having a plurality of breakable projections at the end thereof, the knob shaft transmitting rotation of the knob to the spindle;
- a knob back plate to which the plurality of projections at the end of the knob shaft are affixed;
- a knob face plate at the foremost end of the knob integrally superposed with the knob back plate;
- the knob having a hollow portion and a rear end portion adjacent thereto;
- a knob bottom plate loosely positioned on the knob shaft near the rear end of the knob;
- a locking projection portion formed on the knob shaft; and
- means for resiliently locking the knob bottom plate with the locking projection portion of the knob shaft whereby an excessive twisting force applied to the knob causes the breakable projections of the knob shaft to break permitting the knob shaft to freely rotate on the door lock spindle and whereby pulling out of the door knob from the door lock shaft is prevented by the resilient locking of the knob bottom plate with the locking projection portion of the knob shaft.

2. A door knob preventing forced rotation by application of an excessive twisting load by an intruder or the like to a spindle connected to a door lock assembly comprising:

- a door knob back plate having a pluralty of spaced-apart holes therein;
- a knob shaft locked to the spindle and on which the knob is rotatably mounted; and
- a knob shaft having a plurality of breakable projections thereon which are each spaced apart to be inserted respectively in one of the plurality of holes in the knob back plate to fix the knob back plate to the knob shaft and such that forced rotation of the knob causes the breakable projections to break within the holes and the knob to run freely on the knob shaft.

3. The door knob of claim 2 wherein the breakable projections are positioned at the foremost end of the knob shaft.

4. The door knob of claim 3 including a knob face plate covering the breakable projections to prevent external exposure thereof.

5. The door knob of claim 2 including a check plate having a foremost end thereof and including a hole bored in the knob shaft through which the foremost end of the check plate is resiliently biased to lock the spindle to the knob shaft.

6. The door knob of claim 5 wherein the sheer stress required to break the plurality of breakable projections is less than that required to break the foremost end of the check plate such that the breakable projections break permitting the knob to run freely on the knob shaft while the spindle remains locked to the knob shaft.

7. A door knob fixed on a door knob shaft preventing pulling out by an intruder or the like of the door knob from the door knob shaft comprising:

- a knob having a hollow portion formed therein which defines a rear end of the knob;
- a knob bottom plate which is loosely positioned on the door knob shaft within the knob hollow portion and adjacent to the rear end of the knob hollow portion; and
- a locking projection formed on the door knob shaft, against which projection the knob bottom plate is locked such that the knob is prevented from being pulled out from the door knob shaft by an intruder or the like.

8. The door knob of claim 7 including a spring positioned between the knob bottom plate and the rear end of the knob hollow portion to resiliently lock the knob bottom plate with the locking projection on the door knob shaft.

* * * * *